(12) United States Patent
Gilday

(10) Patent No.: US 7,581,426 B2
(45) Date of Patent: Sep. 1, 2009

(54) TEST ADAPTER FOR AIRCRAFT STATIC VENT

(76) Inventor: Brent D. Gilday, 576, Chemin Main, C.P. 44, Hudson Heights, Québec (CA) J0P 1G0

( * ) Notice: Subject to any disclaimer, the term of this patent is extended or adjusted under 35 U.S.C. 154(b) by 404 days.

(21) Appl. No.: 11/668,170

(22) Filed: Jan. 29, 2007

(65) Prior Publication Data

US 2007/0243012 A1 Oct. 18, 2007

(51) Int. Cl.
G01F 1/42 (2006.01)
G01L 25/00 (2006.01)
G01L 27/00 (2006.01)
B64F 5/00 (2006.01)

(52) U.S. Cl. .............................. 73/1.29; 73/1.57; 73/40; 73/49.4; 73/49.8

(58) Field of Classification Search .................. 73/1.05, 73/1.25, 1.29, 1.57, 40, 49.4, 49.7, 49.8
See application file for complete search history.

(56) References Cited

U.S. PATENT DOCUMENTS

| | | | | |
|---|---|---|---|---|
| 2,371,243 A | * | 3/1945 | Jordan | 73/1.29 |
| 2,623,383 A | * | 12/1952 | Bevins | 73/861.67 |
| 2,897,669 A | * | 8/1959 | Luck et al. | 73/1.58 |
| 3,089,331 A | * | 5/1963 | Sharko et al. | 73/1.58 |
| 3,365,928 A | * | 1/1968 | Andresen, Jr. | 73/1.57 |
| 3,385,095 A | * | 5/1968 | De Leo et al. | 73/1.57 |
| 3,518,870 A | * | 7/1970 | Scharringhausen et al. | 73/1.29 |
| 3,892,121 A | * | 7/1975 | Champoux et al. | 72/393 |
| 4,182,158 A | * | 1/1980 | Culotta et al. | 73/40 |
| 4,384,469 A | * | 5/1983 | Murphy | 73/1.29 |
| 4,557,033 A | * | 12/1985 | Champoux | 29/525 |
| 4,617,826 A | * | 10/1986 | Hagen | 73/182 |
| 5,127,254 A | * | 7/1992 | Copple et al. | 72/370.07 |
| 5,305,627 A | * | 4/1994 | Quincey et al. | 72/370.07 |
| 6,131,441 A | * | 10/2000 | Berube et al. | 73/49.8 |
| 7,509,829 B2 | * | 3/2009 | Johnson | 72/393 |

FOREIGN PATENT DOCUMENTS

| | | | | |
|---|---|---|---|---|
| CA | 639488 A | * | 4/1962 | |
| CA | 650741 A | * | 10/1962 | |
| CA | 664982 A | * | 6/1963 | |

* cited by examiner

*Primary Examiner*—David A. Rogers
(74) *Attorney, Agent, or Firm*—Brouillette and Partners

(57) ABSTRACT

An adapter to test the static vent of aircraft instrumentation is provided. The test adapter comprises an adapter assembly and a seal holder. The adapter assembly comprises a plurality of prongs adapted to be inserted in the vent's holes. The assembly further comprises a locking mechanism cooperating with the prongs to secure the adapter assembly in place. A seal holder, adapted to be mounted on and over the adapter assembly comprises a seal and a hose connector to connect the adapter to the gas or pressure source. The adapter can also be provided with a blanking port which acts as a pre-test device and also as a storage unit for protecting the adapter assembly when not in use.

7 Claims, 7 Drawing Sheets

TEST ADAPTER FOR AIRCRAFT STATIC VENT

FIELD OF THE INVENTION

The present invention relates to a test adapter for an aircraft static vent. More particularly, the current invention relates to a test adapter which can be locked in aircraft static vent during the calibration procedure.

BACKGROUND OF THE INVENTION

In order to measure external parameters, aircrafts are equipped with an ever increasing array of different types of sensors. Some parameters such as rate of climb, altitude and air speed, just to name a few, are usually measured with the use of a plurality of static vent ports located at predetermined locations on the fuselage of an aircraft. These ports may also relate to other functions beside air data testing. In fact, similar ports are also used to test cabin pressure or fuel tanks for example.

Generally speaking, a static vent is a small plate, generally mounted on the side of the fuselage (see FIG. 7). The plate, part of a chamber, comprises a plurality of holes which are connected to the tubes which are linked to the measurement instruments.

Being subjected to repeated cycles of utilisation, the instruments to which these static vents are connected need to be regularly recalibrated. To recalibrate the instruments connected to a static vent, a known pressure is sent through the static vent via an adapter. Then, it is verified that the pressure measured by the instruments is the same as the pressure sent through the static vent. In case of disparity, the instruments are recalibrated.

Nevertheless, in order to obtain a good reading of the calibration pressure, the adapter must be securely attached to the static vent in a sealed manner to prevent any leakage of gas used to calibrate the instruments.

Static vent adapters exist in the art. See for example U.S. Pat. No. 3,017,764, granted to John Gilday. However, the problems with the prior art adapters is that they are designed to fit on static vents with a central hole and preferably a large central hole (i.e. with a diameter greater than 0.062 inch or 1.57 mm). However, in more recent ports, the central hole is either of a reduced diameter (i.e. with a diameter smaller than 0.062 inch or 1.57 mm) or completely inexistent. Also, the static vents of the prior art were generally limited to vacuum testing.

There is therefore a need for a test adapter which obviates the shortcomings of the prior art.

OBJECTS OF THE INVENTION

An object of the present invention is to provide a test adapter which comprises means to effectively lock test adapter in the static vent of an aircraft.

Another object of the present invention is to provide a test adapter which comprises means to prevent the test adapter from exiting a static vent when in use.

Yet another object of the present invention is to provide a test adapter which necessitates limited human intervention.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

To attain these and other objects which will become more apparent as the description proceeds according to one aspect of the present invention, there is provided a test adapter for aircraft static vents.

According to one aspect of the present invention, the test adapter comprises two main components, the adapter assembly and the seal holder.

The adapter assembly of the test adapter generally comprises an inner body, a generally threaded driver or actuator and a locking device threadedly mounted onto the driver and generally slidingly cooperating with the inner body.

As for the seal holder, it comprises a preferably hollow outer body to which is fixedly attached at one end, a preferably ring seal and at the opposite end, a hose connector. The outer body of the seal holder is also adapted to be matingly mounted on and over the adapter assembly via mounting means such as threads.

According to another aspect of the invention, the inner body of the adapter assembly is a hollow cylindrical body having a cylindrical inner bore, an outer surface, an inner surface, a first end face and a second end face. The outer surface of the inner body is threaded or at least partially threaded. These threads are configured to matingly cooperate with the threads of the outer body of the seal holder. The inner body further comprises a plurality of preferably evenly distributed holes going all the way through the inner body from the first end face to the second end face. Mounted coaxially with the holes are hollow prongs, each having a preferably oblique tip.

The adapter assembly further comprises a driver. The driver is an elongated cylindrical body having a first end and a second end. The driver further comprises threads on its outer surface, at least in its central portion thereof. The first end of the driver is pivotally and generally coaxially mounted in the bore of the inner body with holding means known in the art. The second end of the driver generally comprises a small handle. The handle helps in actuating the driver with fingers.

Threadedly mounted on the driver is the locking mechanism. The locking mechanism is also a hollow and generally cylindrical structure having an inner surface, an outer surface, a first end face and a second end face. The inner surface is threaded with threads matching those of the driver. Mounted on the end face facing the inner body are a plurality of pins. These pins are further slidingly mounted inside the hollow prongs. Understandably, the number of pins and the number of prongs are preferably the same. The pins generally extend beyond the tips of the prongs. Also, at the end of the pins are small protuberances. The diameter of these protuberances is substantially the same as the diameter of the prongs.

According to another aspect of the present invention, the seal holder of the test adapter comprises a generally elongated structure comprising a hollow and preferably cylindrical bore. The structure has a first end and an opposite second end. The bore of the structure is threaded at the first end and at the second end. However, the threads of each end need not to be the same since they mate with different components. The structure also has a first end face and a second end face. Located on and fixedly attached to the first end face is a preferably o-ring seal, preferably made of rubber or other similar elastomeric and resilient material. Preferably matingly mounted with the threads of the second end is a hose connector generally known in the art. The hose connector is adapted to be connected to a gas source for generating the calibrating pressure.

According to yet another aspect, the threads of the first end of the seal holder structure are adapted to mate with the threads of the inner body of the adapter assembly.

During the normal course of utilisation, the adapter assembly is first mounted in the holes of the static vent via the prongs and the pins. After insertion, the driver is actuated which in turn, pulls away the locking mechanism threaded structure. By pulling the locking mechanism away, the pins and their protuberances are also pulled toward the tips of the prongs. When the protuberances reach the tips, the combined diameter of the protuberance/tip combination is slightly larger than the diameter of the holes of the vent.

The friction generated between the combined protuberance/tip and the vent hole effectively lock the adapter assembly in place.

The seal holder is then screwed on and over the adapter assembly inner body until the seal is in close contact with the surface around vent. A hose can then be connected to the hose connector of the test adapter (see FIG. 8).

The remaining of the procedure is generally known in the art.

Finally, in yet another aspect of the present invention, the test adapter can be provided with a blanking port. The blanking port is a hollow enclosure equipped with a static vent plate. The blanking port serves generally two purposes.

First, it serves as storage for the adapter body. Indeed, when the adapter assembly is not in use, it can be locked in the port of the blanking port in order to protect the prongs and pins.

Second, it serves as a pre-test device for verifying the good functioning of the test adapter. In fact, beside the holes of the port, the enclosure of the blanking port is preferably closed. Thus, it is possible to test the integrity of the test adapter by simulating a static vent test with the blanking port.

Other aspects and many of the attendant advantages will be more readily appreciated as the same becomes better understood by reference to the following detailed description and considered in connection with the accompanying drawings in which like reference symbols designate like elements throughout the figures.

The features of the present invention which are believed to be novel are set forth with particularity in the appended claims.

DETAILED DESCRIPTION OF THE PREFERRED EMBODIMENTS

With reference to the annexed figures, the preferred embodiments of the present invention will be herein described for indicative purposes and by no means as of limitations.

The figures and description attached to it are only intended to illustrate the idea of the invention. As to the details, the invention may vary within the scope of the claims. So, the size and shape of the test adapter may be chosen to best fit specific static vents.

Figure 1:
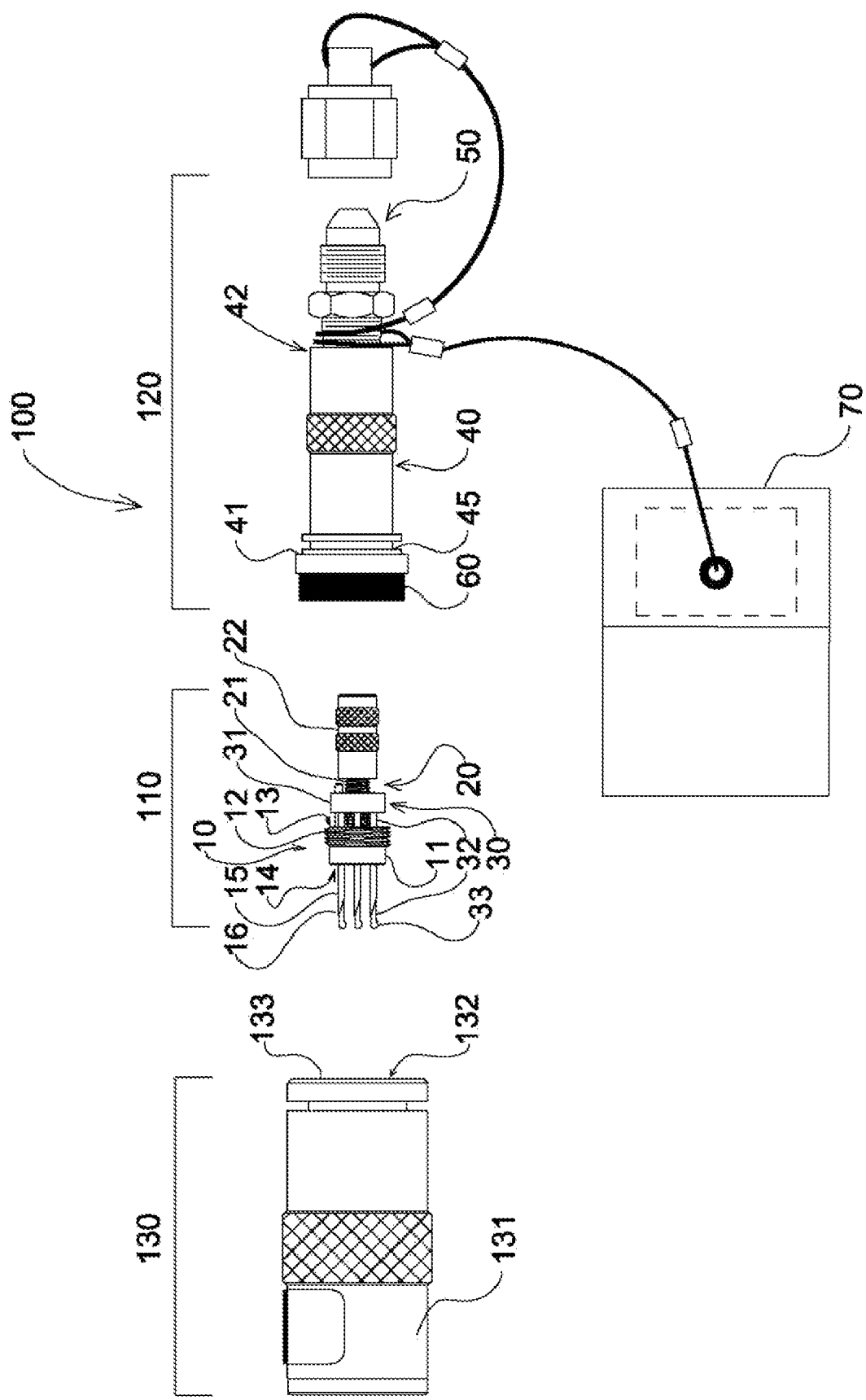
FIG. 1 is a side view of an embodiment of the test adapter of the present invention in an unassembled form.
Figure 2:
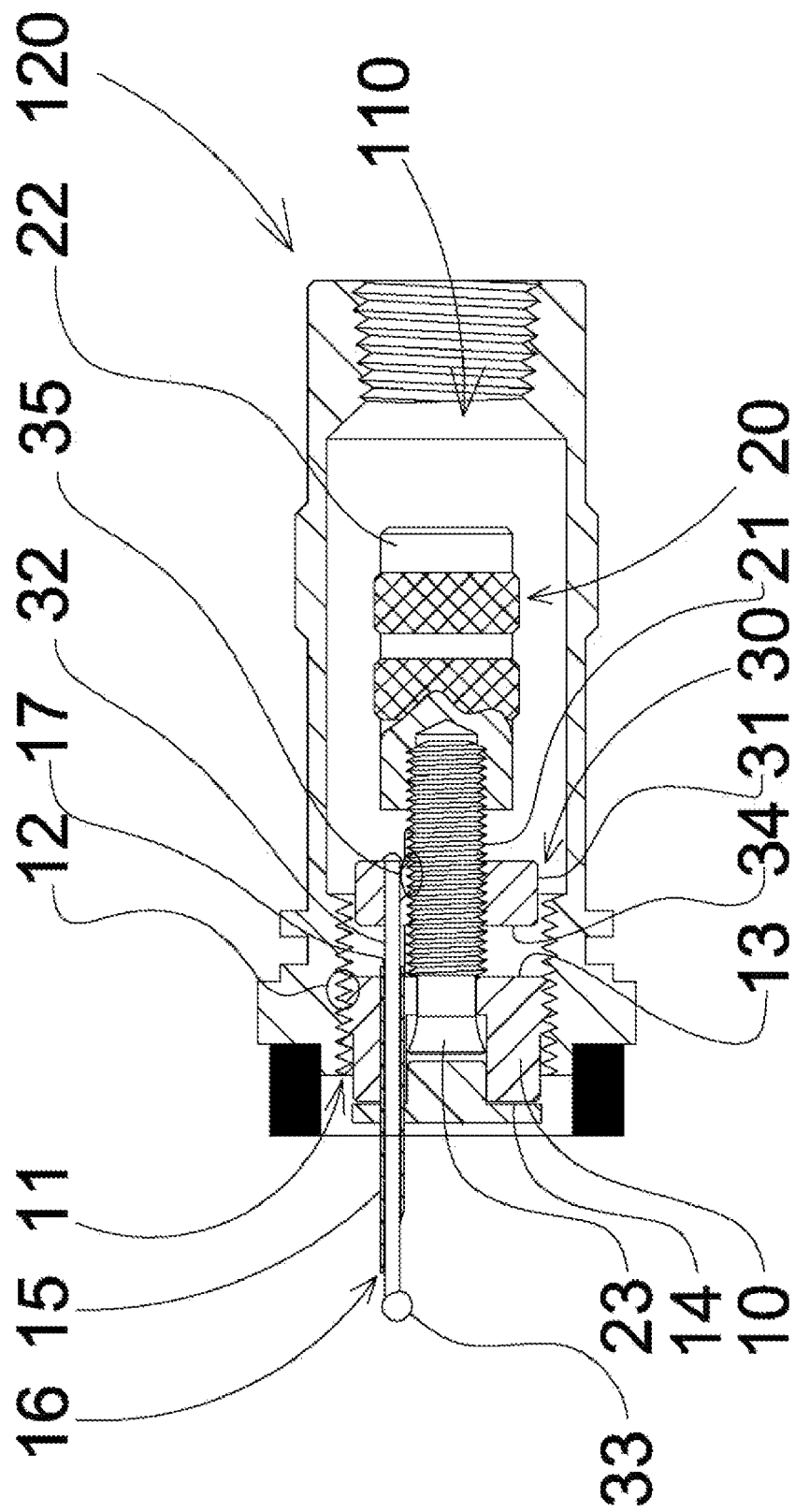
FIG. 2 is a sectional side view of the adapter assembly of the test adapter of the present invention.
Figure 3:
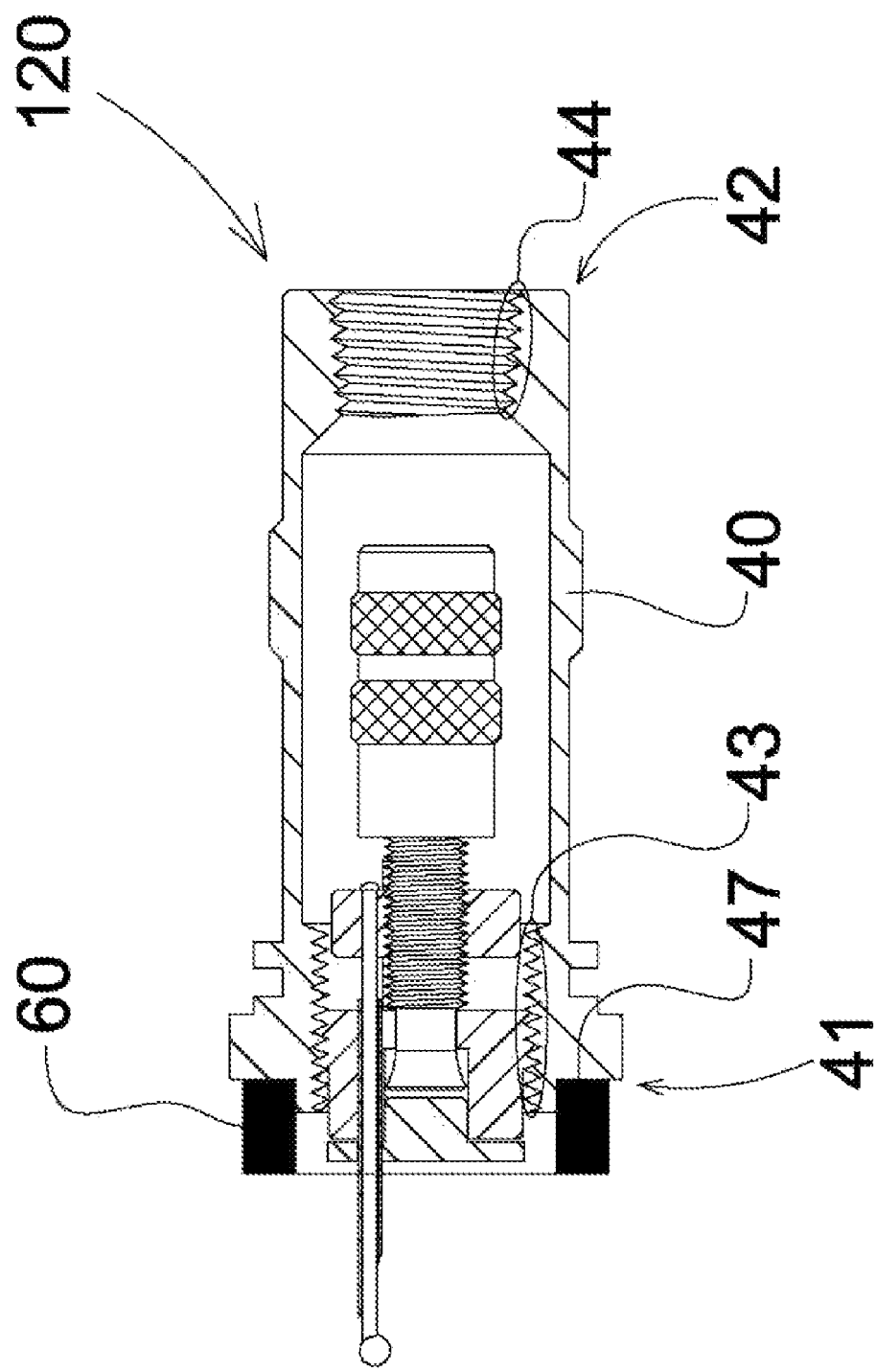
FIG. 3 is a sectional side view of the seal holder of the test adapter of the present invention.

The test adapter 100 of the present in best shown in FIGS. 1 to 3. The test adapter 100 comprises an adapter assembly 110, a seal holder portion 120 and a blanking port 130.

In a nutshell, the test adapter 100 of the present invention functions as follows. First, the adapter assembly 110 is inserted into the static vent of the fuselage. The adapter assembly 110 is then locked in place using locking means. The seal holder 120, comprising a seal 60, is then securely threaded on and over the adapter assembly 110 until the seal 60 is in close contact with the static vent and the static vent is completely covered and sealed by the seal holder 120. A hose (not shown) is then attached to the hose connector 50 of the seal holder 120 in order to provide the gas which will create the calibration pressure. The test adapter 100 being mounted is a sealing arrangement with the static vent, the gas sent through the test adapter is therefore completely sent through the static vent.

The adapter assembly 110, the seal holder 120 and the blanking port 130 shall now be described in more detail.

Adapter Assembly

The adapter assembly 110 comprises several components. Mainly, the adapter assembly 110 comprises a hollow cylindrical inner body 10, a threaded cylindrical driver 20 and a locking mechanism 30.

The inner body 10 is a cylindrical structure having a generally cylindrical bore. The inner body 10 also comprises an inner surface and an outer surface 11. The outer surface 11 comprises threads 12 on at least a portion thereof. The inner body 10 further comprises a first end face 13 and a second end face 14. The inner body 10 also comprises a plurality of cylindrical holes 17 (only one shown in FIG. 2), generally parallel to the axis of the cylindrical body 10 and going all the way through from the first end face 13 to the second end face 14. Finally, mounted generally coaxially with these holes are hollow prongs 15. These prongs 15 are mounted on the second end face 14 of the inner body 10 and act as an extension of these holes 17. The tip 16 of these prongs 15 is preferably oblique.

The driver 20 of the adapter assembly is an elongated cylindrical member having threads 21 on at least the central portion of its outer surface. Mounted at one end of the driver 20 is a small handle 22. The handle 22 is used to actuate the driver 20 with the fingers. The other end 23 of the driver is preferably not threaded and is securely but pivotally and preferably coaxially mounted inside the bore of the inner body 10. The driver 20 can thus freely rotate around its axis as it is actuated. However, the relative position between the driver 20 and the inner body 10 remains substantially the same as the driver is rotated.

The final element of the adapter assembly 110 is the locking mechanism 30. The locking mechanism 30 comprises a preferably cylindrical structure 31 having a cylindrical hollow bore. The bore also comprises threads 35 (shown in FIG. 2) which match with the threads 21 of the driver 20. The cylindrical structure 31 further comprises on the end face 34 facing the inner body 10 a plurality of pins 32 (only one shown in FIG. 2). The pins 32 are mounted inside the holes 17 and prongs 15 preferably extend slightly beyond the tips 16. Therefore, the number of pins 32 is the same as the number of holes 17 and prongs 15. The tip of each pin 32 comprises a protuberance 33. The diameter 33' of the protuberances 33 is larger than the inner diameter 15" of the prongs 15. However, the diameter 33' of the protuberances 33 is generally equal to the outer diameter 15' of the prongs 15. Still, the diameter 15' of the prong 15 and the diameter 33' of the protuberance 33 are slightly smaller than the diameter 210' of the hole 210 of the vent 200 (best seen in FIG. 4).

Seal Holder

The seal holder 120 of the test adapter 100 comprises a hollow body 40. The hollow interior of the body 40 is generally cylindrical. The body 40 further comprises a first end 41 and a second end 42. The interior of the body 40 is threaded at both the first end 41 and the second end 42. However, the type of threads need not be the same since the threads 43 of the first end 41 mate with a different component than the threads 44 of the second end 42.

The threads 43 located near the first end 41 of the body 40 are adapted to mate with the threads 12 of the inner body 10 (best seen in FIG. 3).

A generally o-ring seal 60 is fixedly attached to the end face 47 of the body 40 located near the first end 41. The seal 60, preferably made of rubber or other similar elastomeric and resilient materials, has a shape generally matching the shape the end face 47 of the first end 41.

Finally, located at the second end 42 and threadedly mounted partially within the body 40 is a hose connector 50. The hose connector 50 is of the type generally used and known in the art.

Figure 8:
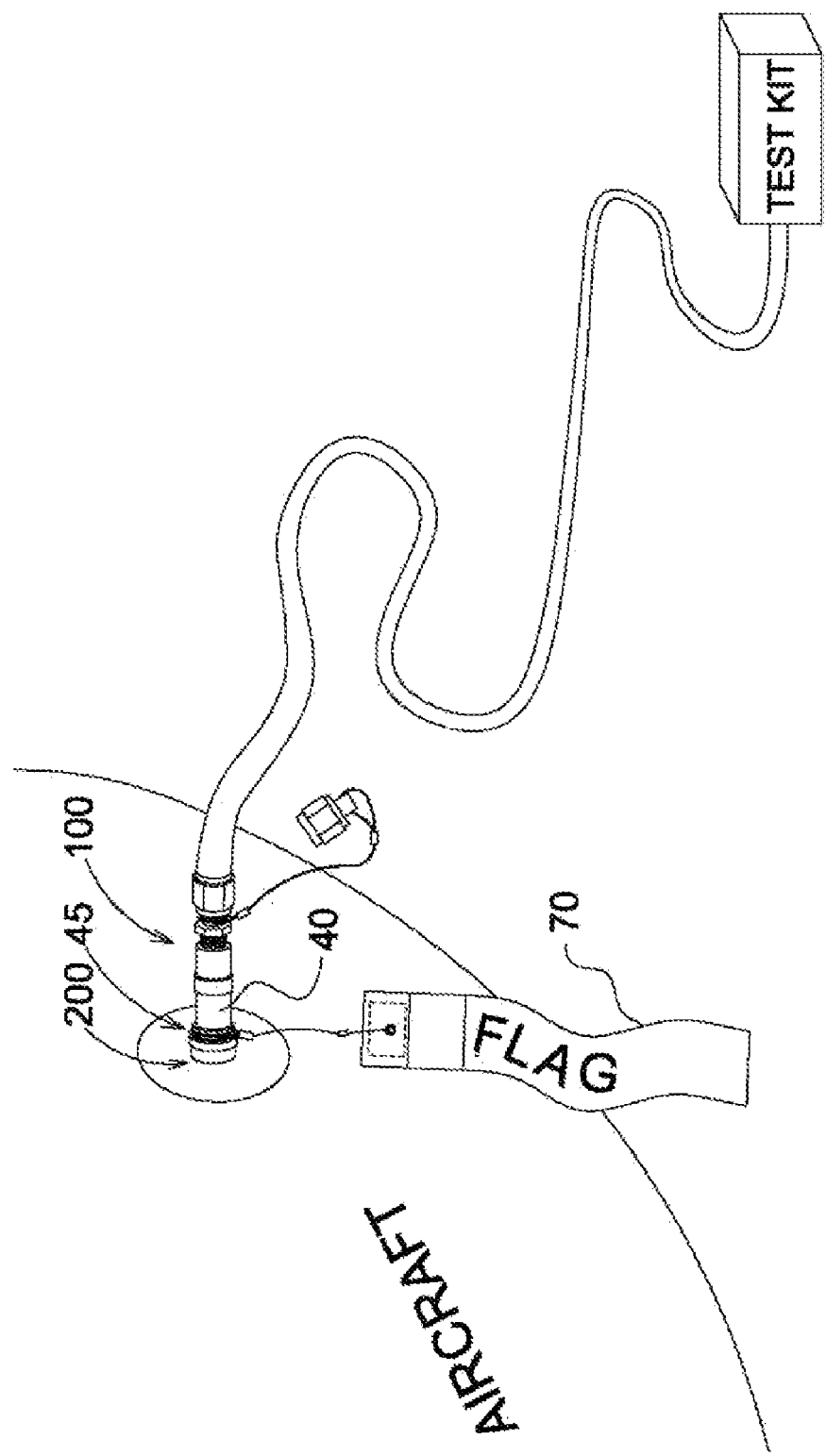
FIG. 8 is a perspective view of the test adapter as mounted in a static vent of an aircraft.

As shown in 1 and 8, the skilled addressee will note that the body 40 can further comprises an optional identification label 70. The label 70 can be directly attached to the body 40 as shown in FIG. 1 or be mounted into an annular groove 45 as shown in FIG. 8 (also shown in dotted lines in FIG. 1).

Blanking Port

Figure 6:
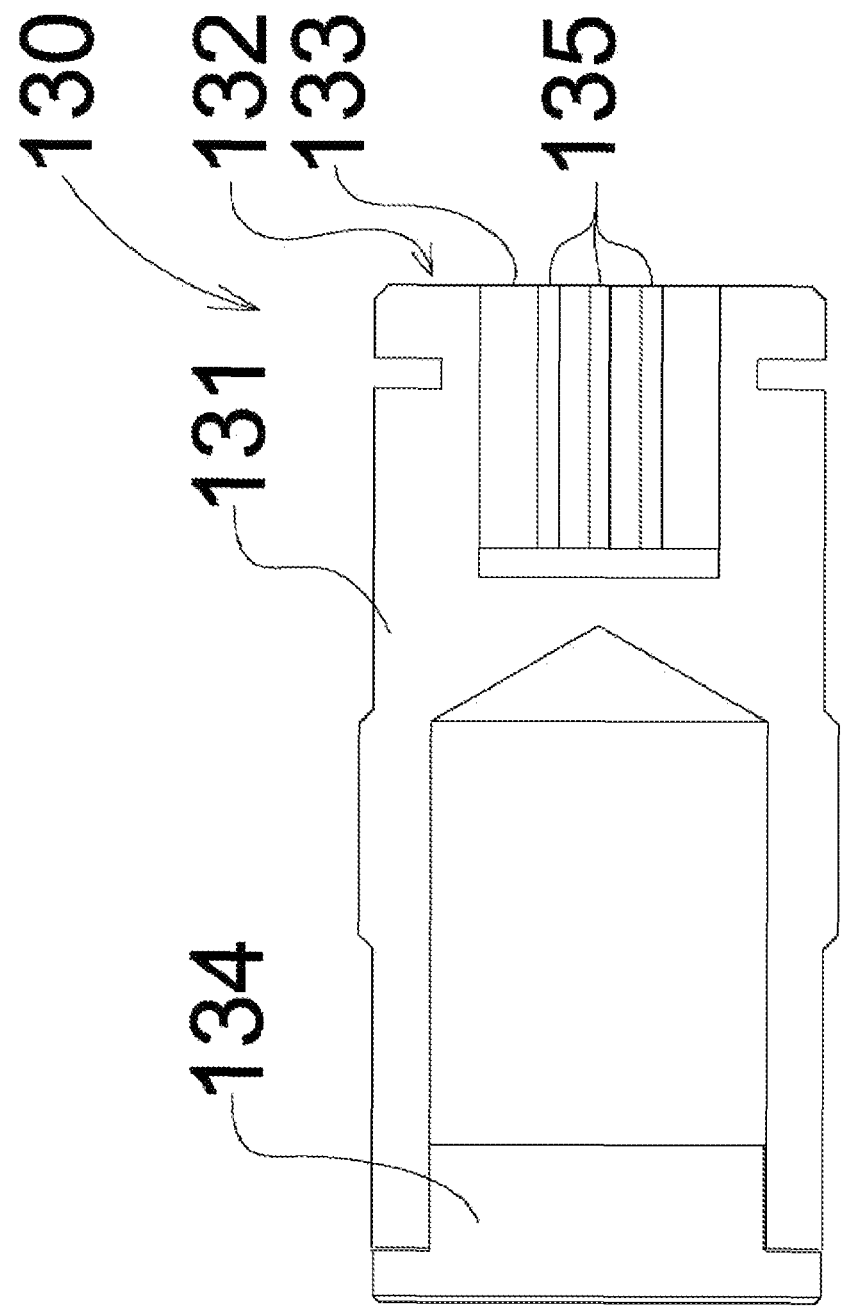
FIG. 6 is a sectional side view of the blanking port of the test adapter of the present invention.

Referring to FIG. 6, the blanking port 130 of the test adapter 100 generally comprises a hollow enclosure 131 and a static vent port 133. The static vent port 133 is of the same type as those used on real aircraft.

Since, in the preferred embodiment, the static vent 133 is generally cylindrical, the enclosure 131 is preferably of cylindrical shape though this is not an absolute prerequisite. In fact, any shape could be used as long as the static vent port 133, which can be of different shapes, is effectively enclosed.

The enclosure 131 generally comprises at least one flat surface 132 having an aperture through which the static vent port 133 is fixedly inserted inside the enclosure 131.

In the preferred embodiment, the enclosure 131 is closed with a seal or plug 134 made of plastic or other similar polymeric materials. However, other materials could also be used without departing from the scope of the invention.

The static vent port 133 comprised in the blanking port 130 also comprises holes 135 into which the prongs 15 and pins 32 of the adapter assembly 110 can be inserted and effectively locked.

As stated earlier, the blanking port 130 serves two purposes. First, when the adapter assembly 110 is not in use, the prongs 15 and the pins 32 of the adapter assembly are preferably inserted and locked into the static vent port 133 of the blanking port. By doing so, the prongs 15 and the pins 32, which are generally small and relatively fragile components, are protected. The possibilities of breaking or damaging the prongs 15 and the pins 32 are therefore reduced.

Also, the blanking port 130 can be used to test the integrity of the adapter assembly 110, the seal holder 120 and the other components generally involved in the testing of a static vent. Since the port 133 of the blanking port 130 is an actual representation of a real static vent port, it is possible to install the test adapter 100 on the blanking port 130 and to simulate or pre-test the functioning of the test adapter 100. For example, the blanking port 130 could be used to detect leaks in the seal holder 120 or the hoses.

Understandably, different blanking ports 130 could be provided with different ports 133 depending upon the change of static vent ports design. The port 133 shown in FIG. 6 is thus shown as an example and is by no means limitative in nature.

Generally Functioning

Figure 4:
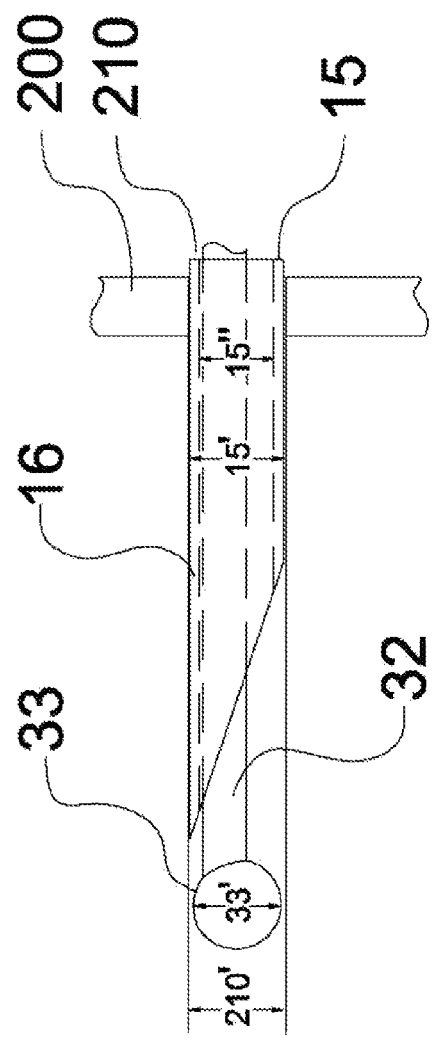
FIG. 4 is a close-up side view of tip of the prong of the adapter assembly in its unlocked position.
Figure 5:
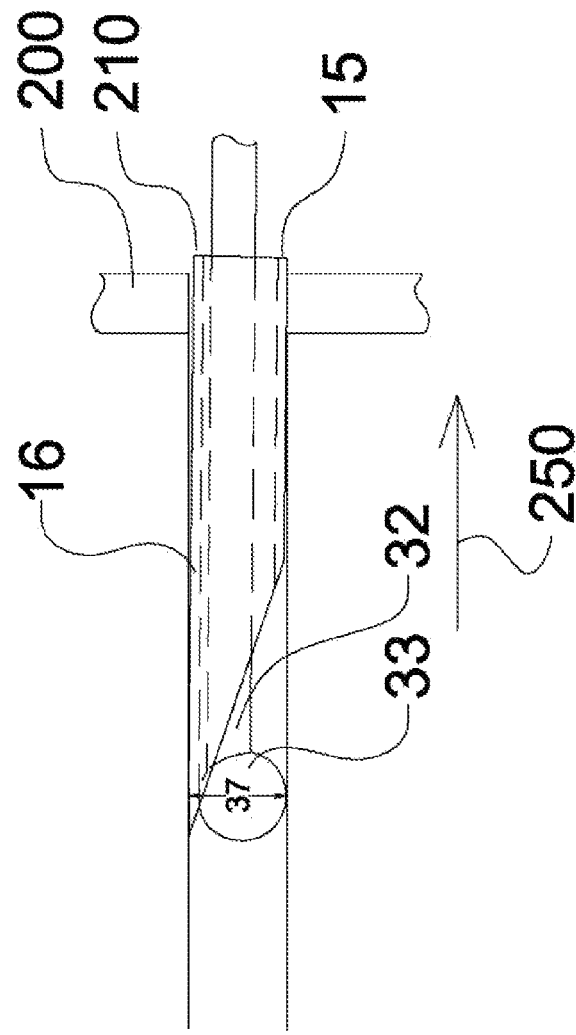
FIG. 5 is a close-up side view of tip of the prong of the adapter assembly in its locked position.
Figure 7:
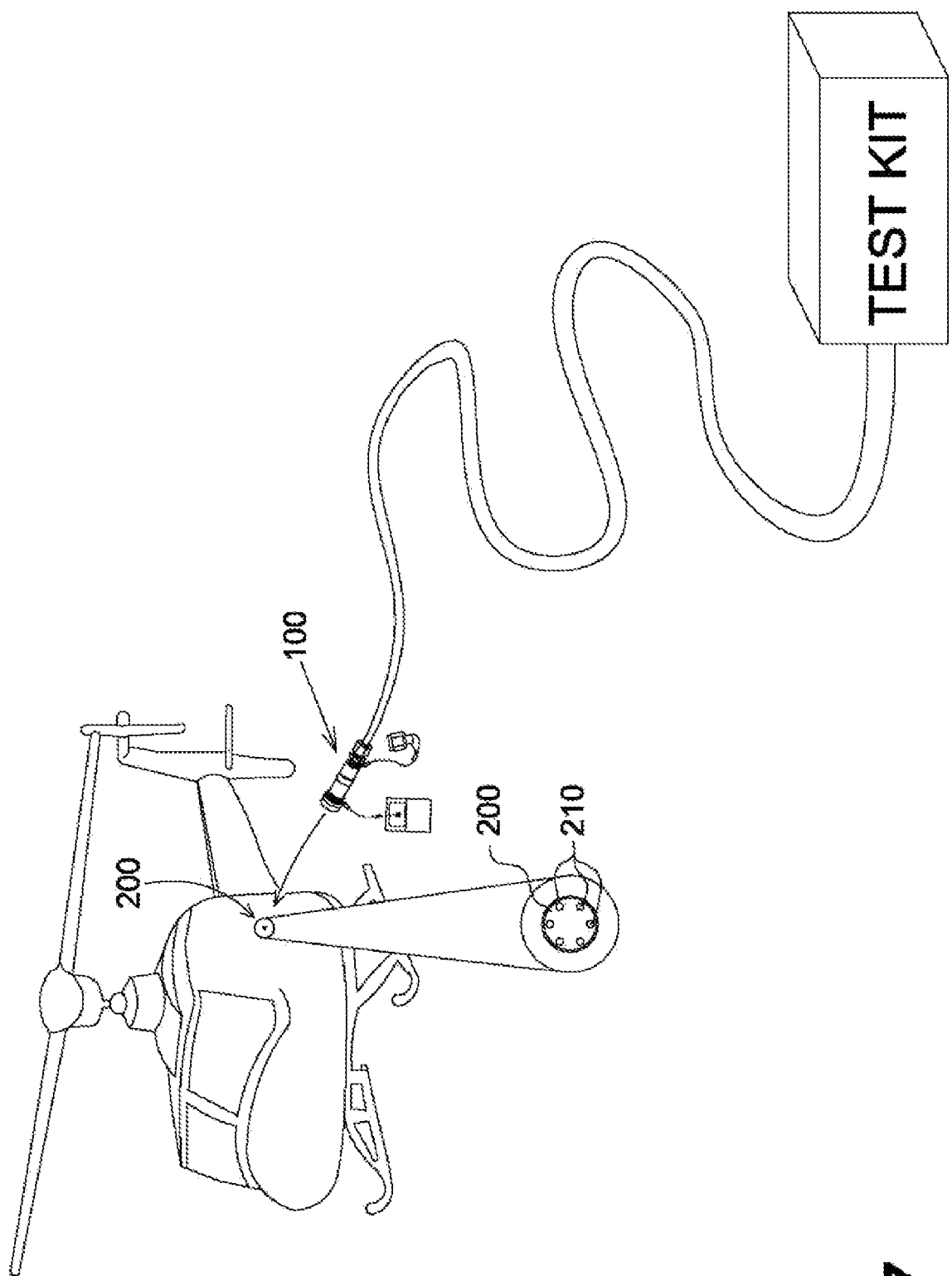
FIG. 7 is perspective vide of an aircraft and one of its static vent.

As best shown in FIGS. 4 and 5, in use, the prongs 15 of the adapter assembly 110 are inserted into holes 210 of a static vent 200 located on the fuselage of an aircraft (see FIG. 7). When the prongs 15 are fully inserted, the driver 20 is actuated or turned via the handle 22. Since the relative position between the driver 20 and the inner body 10 does not substantially change as the driver is actuated, only the locking mechanism 30 moves. Indeed, since the pins 32 of the locking mechanism 30 are mounted inside the holes and prongs 15, the cylindrical structure 31 cannot freely pivot as the driver 20 turns. Therefore, the threaded coupling between the cylindrical structure 31 and the driver 20 transforms the pivotal movement of the driver 20 into a linear movement of the cylindrical structure 31. Thus, as the driver 20 is actuated, the cylindrical structure 31 and hence, the locking mechanism 30, moves linearly along the threaded portion 21 of the driver 20, effectively pushing or pulling the pins 32.

As best seen in FIGS. 4 and 5, when the pins 32 and their protuberances 33 extend freely beyond the tips 16, the prongs 15 and pins 32 can be freely inserted in or removed from the holes of the vent since the diameters 33' and 15' of the protuberances 33 and the prongs 15 respectively are slightly smaller than the diameter 210' of the vent's holes 210.

However, when the driver 20 is actuated, the cylindrical structure 31 is pulled away from the inner body 10, effectively pulling in the pins 32 and their respective protuberances 33 (see arrow 250). When the protuberances 33 reach the tip 16 of their respective prong 15 (as best seen in FIG. 5), the combined diameter 37 of the protuberance 33 and the prong 15 becomes slightly larger than the internal diameter 210' of the vent's hole 210. The friction generated between the protuberance/prong combination and the hole 210 effectively locks the adapter assembly 110 in place.

Still, when the adapter assembly 110 has been securely locked in the vent, the next step is to threadedly mount or screw the seal holder 120 around and over the adapter assembly 110. This is done by screwing the threads 43 of the seal holder 120 to the threads 12 of the adapter assembly 110 inner body 10. The seal holder 120 is screwed until the seal 60 is compressed around the vent. A hose (not shown) connected to a gas source is then attached to the hose connector 50. The gas source will provide the calibration pressure. FIG. 8 shows an example of a test adapter of the present invention as installed in the vent of an aircraft.

To remove the test adapter, the previous steps are done inversely.

Although a preferred embodiment of the invention have been described in detail herein and illustrated in the accompanying figures, it is to be understood that the invention is not limited to this precise embodiment. For example, in a possible variant of the present invention, the pins could be fixed and the hollow prongs could be moveable, with respect to the pins, with a driver or a similar actuator. Therefore, various changes and modifications may be effected therein without departing from the scope or spirit of the present invention.

The invention claimed is:

1. A test adapter for use with a static vent of an aircraft, said static vent having at least one aperture of a first diameter, said test adapter comprising a seal holder and an adapter assembly, said seal holder comprising a seal and a hose connector and being adapted to be mounted on and over said adapter assembly in a sealing arrangement with said static vent, said adapter assembly comprising:
   a) an inner body, said body comprising at least one hole and at least one hollow prong mounted generally coaxially with said at least one hole, said at least one prong having a second diameter and a free end;
   b) a driver mounted in said inner body;
   c) a locking mechanism adapted to be operatively mounted to said driver, said mechanism further comprising at least one pin extending through said at least one hole and said at least one prong, said pin having a tip, said tip comprising a protuberance having a third diameter;
wherein upon actuation of said driver, said protuberance and said at least one prong free end are drawn closer to each other, said combined protuberance and at least one prong being frictionally locked within said aperture of said vent.

2. A test adapter as claimed in claim 1 wherein said inner body further comprises a bore and wherein said driver is pivotally mounted in said bore.

3. A test adapter as claimed in claim 2 wherein said inner body has an outer surface, said outer surface comprises threads and wherein said seal holder further comprises a hollow outer body having a cylindrical bore, said outer body having a first end portion and a second end portion, a portion of said bore located near said first end portion comprising threads and wherein said threads of said inner body match said threads of said outer body first end portion.

4. A test adapter as claimed in claim 3 wherein said driver comprises a cylindrical structure having a first end portion, a second end portion and a central portion between said first end portion and said second end portion, said central portion comprising threads and said first end portion being adapted to be pivotally mounted in said bore of said inner body.

5. A test adapter as claimed in claim 4 wherein said locking mechanism further comprises a hollow structure having a cylindrical bore, said hollow structure having a first end face, a second end face, an inner surface and an outer surface wherein said inner surface of said hollow structure comprises threads, said threads of said inner surface matching said threads of said cylindrical structure of said driver and wherein said first end face is facing said inner body and wherein said at least one pin extends from said first end face.

6. A test adapter as claimed in claim 5 wherein there is a plurality of holes, a plurality of prongs and a plurality of pins and wherein each of said pins is associated with one of said holes and one of said prongs.

7. A test adapter as claimed in claim 1, further comprising a blanking port, said blanking port comprising:
   a) a hollow enclosure comprising at least one flat surface, said flat surface having a hole;
   b) a blanking static vent, said blanking static vent being fixedly mounted inside said enclosure via said hole, said blanking static vent having at least one aperture having a fourth diameter;
wherein said at least one aperture of said blanking static vent of said blanking port is adapted to receive said at least one prong and said at least one pin and wherein upon actuation of said driver, said protuberance is moved substantially adjacent to said at least one prong free end, said combined protuberance and at least one prong being frictionally locked within said aperture of said blanking static vent.

* * * * *